June 28, 1960  E. E. SARTOR  2,942,464
AZIMUTH-ELEVATION CORRECTION DATA INDICATOR
Filed Dec. 2, 1958

INVENTOR,
EUGENE E. SARTOR.
BY Jack H. Linscott
ATTORNEY

United States Patent Office

2,942,464
Patented June 28, 1960

2,942,464

AZIMUTH-ELEVATION CORRECTION DATA INDICATOR

Eugene E. Sartor, Neptune, N.J., assignor to the United States of America as represented by the Secretary of the Army Filed Dec. 2, 1958, Ser. No. 777,802

3 Claims. (Cl. 73—189)

This invention relates generally to an improved device for measuring the direction and velocity of wind, and more particularly to an azimuth-elevation correction indicator for rocket launching equipment.

The objects of this invention are to provide an electronic azimuth-elevation correction indicator which is simple and reliable in operation, which utilizes fewer components than existing equipment, which is readily portable and which provides extremely accurate correction indications to rocket launching installations.

These and other objects of this invention are accomplished by using a wind speed transmitter comprising an impeller and a tail vane. The speed of rotation of the impeller and the direction of rotation of the tail vane are directly related to the speed and direction of the wind, respectively. The impeller shaft is mechanically coupled to a direct-current generator, the generated voltage of which is applied across the input terminals of a sine-cosine potentiometer whose shaft is mechanically coupled to the tail vane. The two voltage outputs of the sine-cosine potentiometer are applied to two similar RC integrating channels which convert them into elevation and azimuth corrections, easily readable on two zero centered microammeters which are suitably calibrated in the measured parameters.

The features of this invention which are believed to be novel are set forth with particularity in the appended claims. The present invention itself, both as to its organization and manner of operation, together with further objects and advantages thereof may best be understood by reference to the following drawings, in which like reference characters refer to similar parts and in which:

Figure 1:
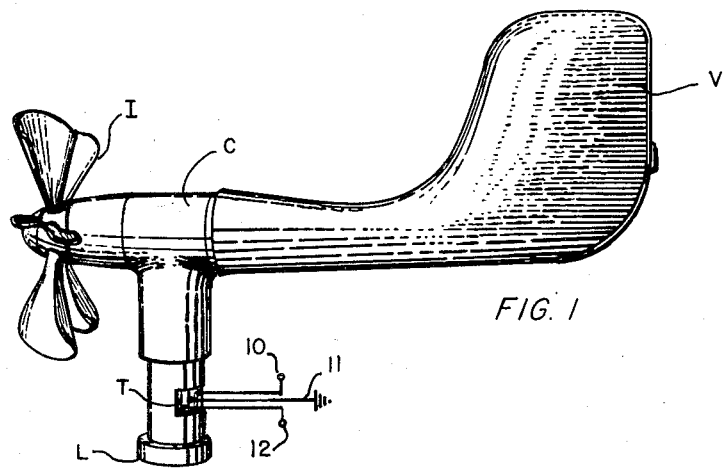
Fig. 1 is a side view of the wind velocity and direction transmitter.
Figure 2:
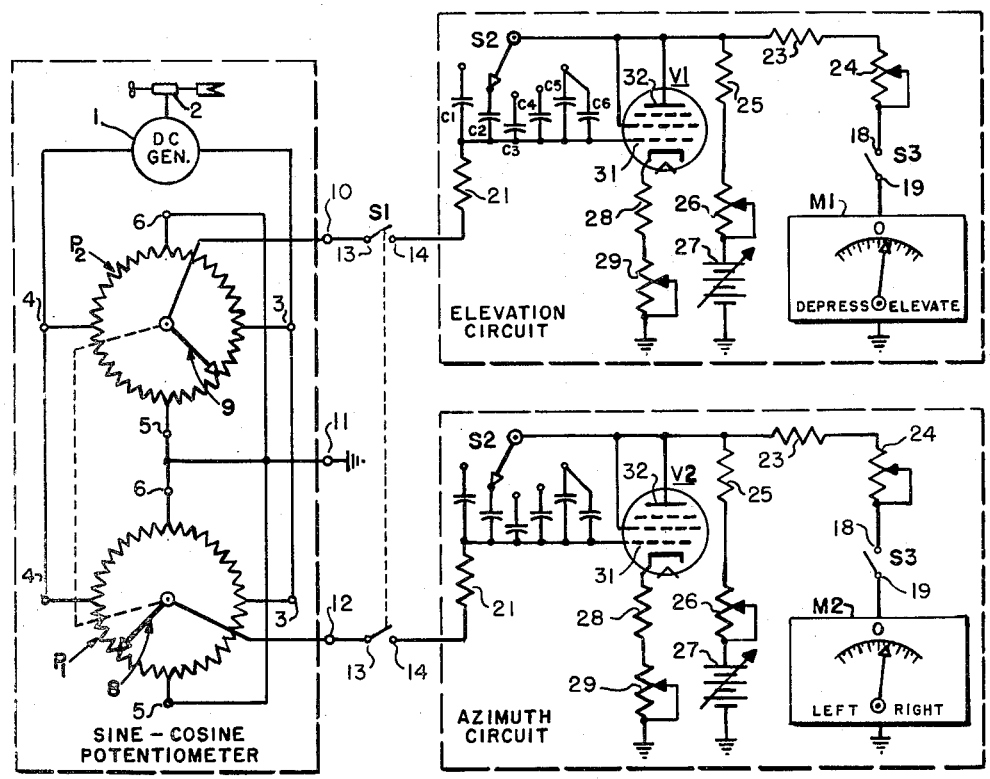
Fig. 2 is a schematic diagram of the electric circuit of the azimuth and elevation correction data indicator.

In Fig. 1, the impeller I is so designed that its velocity is directly proportional to the velocity of the wind, the tail vane V detects the wind direction, and keeps the impeller positioned into wind. The generator and sine-cosine potentiometer of Fig. 2 are located inside the central portion C. The impeller drives the direct-current generator whose output voltage is applied to the input terminals of the sine-cosine potentiometer. The output voltages of the latter appear between wires 10–11 and 11–12 of the terminal box T. The locking collar L is mounted on a hydraulically operated mast carried on a mobile vehicle.

In Fig. 2, the D.-C. generator 1 is shown to be mechanically driven by propeller 2. The output voltage of the generator is connected to the input terminals 3, 4 of a two-ganged potentiometer. Terminals 5 and 6 of each section of the potentiometer are grounded at 11. Sections P1 and P2 are divided into four quadrants by terminals 3 through 6. The two ganged brushes of the sine-cosine potentiometer are perpendicularly disposed and mechanically coupled, inside the central portion C, to the vane V. Hence, the rotation of the vane and, consequently, the instantaneous position of the ganged brushes 8 and 9 is determined by the direction of the wind. Brushes 8 and 9, being at right angle to each other, produce two output voltages at binding posts 10 and 12 which are the sine and cosine components of the input voltage developed by generator 1 or, in other words, the Cartesian co-ordinates of the wind velocity. These voltages are applied through a ganged switch S1 to the respective inputs of two similar RC integrating networks. One of the integrating circuits provides the elevation correction and the other the azimuth correction. Since both circuits are similar only the elevation circuit will be described below. The components of the azimuth circuit are given the same reference numerals as those of the elevation circuit to simplify the disclosure, although in the actual equipment they may assume different numerical values.

The input signal to the elevation circuit is applied from binding post 10 through contacts 13—14 of switch S1, resistor R21 to grid 31 of amplifier V1. Resistor R21 and capacitor C1 through C6 form a resistance-capacitance (RC) network which dampens the meter circuit. Capacitors C1 through C6 may be inserted into the circuit as required by the time constant selector switch S2. The larger the capacitor, the greater the amount of dampening, and consequently the longer the time constant. Resistor R28 and potentiometer 29 in the grid-cathode circuit of pentode V1 are properly selected to develop the required bias.

The output voltage at the plate 32 of amplifier V1 increases or decreases as the input signal applied to grid 31: a negative input signal decreases the output, causing the zero centered meter M1 to indicate to the left; a positive input signal increases the output, causing an indication to the right. The output signal is applied from the plate 32 through resistor 23, potentiometer 24, contacts 18–19 of switch S3 to the positive terminal of meter M1, the negative terminal of which is grounded. Resistors R25 and R23, potentiometers R26 and R24 and meter M1 are connected in series-parallel with amplifier V1 to form a plate load network. Potentiometers R26 and R24 provide a means of adjusting the voltage drops across the parallel branches of the plate load network until the voltage drop across meter M1 causes the meter to indicate zero when no signal is applied to amplifier V1. Switch S1 may be opened for this purpose. The variable direct-current power supply 27 provides the B+ to plate 32 of amplifier V1. The elevation correction meter M1 and the azimuth correction meter M2 are calibrated in mils. One half of the zero centered scale of the elevation meter is labelled "Elevate" and the other half is labelled "Depress." Similarly, one half of the zero centered scale of the azimuth meter is marked "Right" and the other half "Left." Thus, the final correction data as read on the meters is as follows: "Right" or "Left" a number of mils on the azimuth meter M2; "Elevate" or "Depress" a number of mils on the elevation meter M1.

While this invention has been described in conjunction with present preferred embodiments thereof, it should be apparent that the invention is not limited thereto.

What is claimed is:

1. A system for providing azimuth and elevation corrections due to wind conditions to rocket launching installations, comprising means for generating electrical energy proportional to the wind velocity, vane means for detecting the wind direction, a sine-cosine potentiometer having two ganged perpendicular brushes mechanically coupled to said vane means, means for applying said electrical energy to the input of said sine-cosine potentiometer, the two output voltages of which represent the Cartesian co-ordinates of the wind velocity, an elevation resistance capacitance integrating amplifier, an azimuth integrating amplifier, and means for connecting one of said output voltages to said elevation amplifier and the other of said outputs to said azimuth amplifier.

2. The system in accordance with claim 1 wherein each of said integrating amplifiers comprises an input resistor, a vacuum tube having at least three electrodes, a plurality of capacitors connected between the grid and the plate of said vacuum tube, the values of said resistor and said capacitors determining the time constant of said integrating amplifiers; a variable direct-current voltage supply, two potentiometers, a microammeter all connected in series; and means for connecting the plate of said vacuum tube to the junction of said potentiometers.

3. The system in accordance with claim 2 wherein said microammeter is zero centered and calibrated in mils, and one of said potentiometers is preset for a zero reading on said microammeter in the absence of an input signal to said integrating amplifier.

References Cited in the file of this patent

UNITED STATES PATENTS

| | | |
|---|---|---|
| 2,519,180 | Ergen | Aug. 15, 1950 |
| 2,596,472 | Ergen | May 13, 1952 |
| 2,619,527 | Gray | Nov. 25, 1952 |

OTHER REFERENCES

"Electronic Analog Computers," by Korn and Korn, page 281, Figure 6.52b.